United States Patent Office 3,345,386
Patented Oct. 3, 1967

3,345,386
1α,7α-DIMETHYLSTEROIDS
Rudolf Wiechert, Josef Hader, and Friedmund Neumann, Berlin, Germany, assignors to Schering AG., Berlin, Germany
No Drawing. Filed Apr. 16, 1965, Ser. No. 448,845
Claims priority, application Germany, Apr. 18, 1964, Sch 34,993
9 Claims. (Cl. 260—397.4)

This invention relates to 1α,7α-dimethyl steroids of the formula

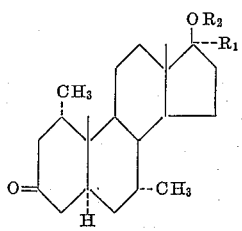

in which $R_1$ is hydrogen, alkyl or alkenyl, or alkinyl, and $R_2$ is hydrogen, an acyl radical of an organic carboxylic acid, or the radical of a physiologically replaceable inorganic acid.

The acyl radical ($R_2$) in the 17-position may be derived from any organic carboxylic acid which can be introduced in known manner into the steroid molecule by esterification of free hydroxyl groups by means of the corresponding carboxylic acid or its derivatives. Thus it may be the acyl group of a saturated or unsaturated, straight or branched chain, cycloaliphatic, aromatic or araliphatic, mono- or polybasic organic acid, including heterocyclic organic acid, particularly those containing up to 12 carbon atoms in the acid radical. Examples of such acids are acetic acid, propionic acid, caproic acid, heptanoic acid, undecylenic acid, trimethylacetic acid, t-butyl acetic acid, or β,β,β-trimethyl propionic acid, cyclopentyl propionic acid, benzoic acid, phenylpropionic acid, phenylacetic acid, succinic acid, adipic acid, as well as acids substituted by halogen, keto, or free or functionally modified hydroxyl groups, or free or functionally modified amino groups. Examples of the latter include such halogen fatty acids as monochloroacetic acid, dichloroacetic acid, pyruvic acid, levulinic acid, etc.

In case $R_2$ is a radical of an inorganic acid, the preferred radical is a sulfate or phosphate radical.

In case $R_2$ is a polybasic organic acid radical, the free carboxylic group also may be esterified or may be converted to a physiologically acceptable salt.

The saturated and unsaturated alkyl groups in the 17α-position ($R_1$) include particularly the lower alkyl, alkenyl and alkinyl groups such as methyl, ethyl, vinyl and ethinyl groups.

The new 1α,7α-dimethyl steroids of this invention have strong androgenic activity which is most surprising in view of the knowledge that the introduction of a methyl group into the 1α- or 7α-position of the 17α-methyl testosterone appreciably diminishes the sex-specific activity thereof.

The androgenic activity of, for example, 1α,7α-dimethyl- and of 1α,7α,17α-trimethyl-5α-androstane-17β-ol-3-one is a multiple of the androgenic activity of testosterone, commonly considered as a standard. The new compound can be administered not only parenterally but also perorally, whereby particularly the compounds wherein $R_1$ stands for a saturated or unsaturated lower alkyl group as, for example, the 17α-methyl compounds are especially suitable. The esters of the steroids of the invention with higher fatty acids show protracted effects. The following table compares the values for androgenic and anabolic efficacy of two of the compounds of the invention with those of testosterone. The values were obtained by commonly used androgenic-anabolic tests carried out on castrated male rats after twelve daily subcutaneous administrations of the compound of 1 ml. each per animal.

| Compound | Seminal Vesicle Weight (mg./100 g. of rat) | Levator ani Weight (mg./100 g. of rat) |
|---|---|---|
| 1α,7α-dimethyl-5α-androstane-17β-ol-3-one | 627 | 55 |
| 1α,7α,17α-trimethyl-Δ⁴-androstene-17β-ol-3-one | 505 | 55 |
| Testosterone | 99 | 31 |

The compounds of the invention, because of their surprisingly high efficacy, are advantageously useful in the treatment of all illnesses in which androgenic therapy is indicated, e.g., in the treatment of climacteric and the effects thereof, for the treatment of peripheral circulatory disorders, heart insufficiencies, protein improverishments due to infections, cirrhosis of the liver and the ante- and post-operative treatment and the like.

For therapeutic use, the new 1α,7α-dimethyl steroids are combined with the usual carriers, additives and flavoring agents by methods well known in the art. For oral administration, tablets, dragees, capsules, pills, suspensions, and solutions are particularly desirable and for parenteral administration, oily solutions such as, for example, sesame oil or castor oil solutions which preferably also have a diluting agent such as benzyl benzoate or benzyl alcohol are desirable. The concentration of the active substance in the therapeutic agents thus formulated depends, of course, on the form of administration. Compositions intended for oral administration preferably contain from about 1 to 20 mg. of active substance per 1 to 1.5 grams of ultimate preparation and the oily solutions preferably contain about 5 to 100 mg. of active material per ml. of solution.

The new 1α,7α-dimethyl steroids of the invention can be prepared by reducing the Δ⁴-double bond of compounds of the formula

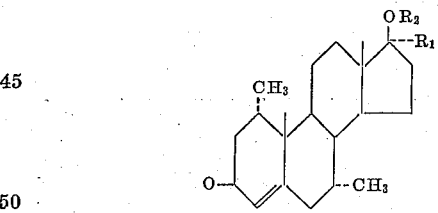

in which $R_1$ and $R_2$ are as previously defined, if necessary after shielding of the 3-keto group. If necessary, a free 17β-hydroxyl group is esterified with an organic carboxylic acid or reactive derivative thereof or with a physiologically acceptable inorganic acid or a 17β-ester is hydrolysed. If $R_1$ in the compounds used as starting materials represents hydrogen and the end-products required are compounds in which $R_1$ represents a saturated or unsaturated aliphatic group, the 3-keto group in 1α:7α-dimethylandrostanes of the formula

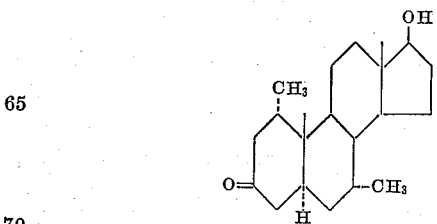

first formed is shielded advantageously by ketalization and the 17β-hydroxyl group is oxidized. The latter two steps can be carried out in any desired sequence. Subsequently the resulting 17-keto group is converted by the Grignard reaction into the

group, and, if desired or required, an alkynyl group introduced in an analogous manner is hydrogenated to an ankenyl or alkyl group with hydrogen in the presence of a metal catalyst before or after reformation of the 3-keto group by elimination of the 3-keto shield by an acid treatment. Finally, if desired, the 17β-hydroxyl group is esterified with the desired organic carboxylic acid or a reactive derivative thereof or with a physiologically acceptable inorganic acid.

For the conversion of the 3 - keto - $\Delta^4$ grouping of the initial material into the 3 - keto - 5α - androstane structure, a Birch reduction with metallic lithium in liquid ammonia is particularly suitable. The formation of the 3 - keto - 5α - androstane structure can also, however, be achieved by catalytic hydration, preferably in the presence of palladium on a carrier substance such as calcium carbonate, barium sulfate or carbon whereby it is necessary in order to obtain useful yields to shift the $\Delta^4$-unsaturation to the 5,6 - position by introduction of an intermediary ketone protection. Ketalization is particularly suitable. This does not exclude other known keto-protecting reactions such as enamine-, enolester-, or enol-ether formation. After hydration in the 5α-position, the 3-keto group is reformed by splitting off the keto-protective agent by means of acids preferably with dilute sulfuric acid, acetic acid, formic acid or p-toluene sulfonic acid.

For the preparation of 1α,7α-dimethyl steroids which contain a saturated alkyl group in the 17α-position, the starting material is either one in which this substituent is already in the 17α-position or it is introduced after conversion of the 3-keto-$\Delta^4$ grouping into the 3-keto-5α-androstane group. For the latter introduction of $R_1$ insofar as saturated and unsaturated alkyl groups are concerned, it is first of all necessary to oxidize the free 17β-hydroxyl group which may have been built up because of previous saponification of a 17β-acyloxy group. Preferably oxidation is carried out with chromic acid at reduced temperatures if desired in the presence of preferably organic bases such as pyridine. It is also possible, however, to utilize other methods known in steroid chemistry for the oxidation of hydroxyl groups such as, for example, the methods of Oppenauer.

Before introduction of the desired 17α-substituent, it is necessary to protect the 3-keto groups in the manner described above, advantageously also by ketalization with ethylene glycol at room temperature. It is particularly desirable to introduce the 3-keto protection only after oxidation of the 17β-hydroxyl group. By the foregoing reduction, especially with a Birch reduction, of the 3-keto-$\Delta^4$ grouping to the 3 - keto - 5α - androstane grouping, the side product that is formed also contains the 3-hydroxy compound which, without requiring purification steps, can quantitively be reoxidized to the desired 3 - keto - 5α - androstane compound.

The introduction of a saturated or unsaturated alkyl group can also be carried out by equivalent means, e.g. by reaction of the keto group with a lithium alkyl, e.g., lithium methyl, in a suitable anhydrous solvent or with acetylene in liquid ammonia or in tertiary butyl- or tertiary amyl alcohol in the presence of alkali metals, especially potassium, or with a lithium acetylide-ethylene diamine complex in suitable anhydrous solvents.

If final products are desired which have an alkenyl group in the 17α-position, e.g., 17α-vinyl compounds, these can readily be obtained from the corresponding compound having an alkinyl group in the 17α-position, e.g., 17α-ethinyl compounds by reduction of the triple bond, whereby it is, of course, also possible to hydrate the 17α-alkinyl group all the way to a saturated alkyl.

Palladium, palladium-carbon, palladium-calcium carbonate, palladium-barium sulfate are catalysts that are particularly suitable for this purpose.

The starting materials required for the preparation of the compounds of the invention can be prepared from 1α - methyl - $\Delta^{4,6}$ - androstane - diene - 17β - ol - 3 - one-17 acetates which are transformed by 1,6 - addition of a methyl magnesium halide in the presence of cuprous chloride in tetrahydrofurane into 1α,7α - dimethyl - $\Delta^4$ - androstane - 17β - ol - 3 - one having a melting point of 202 to 204° C. By reacylation of the 17β - hydroxyl group in known manner one obtains the corresponding 17-ester, e.g., of the 17β - acetate (melting point 145–146° C.) by esterification with acetic anhydride in pyridine. A saturated or unsaturated alkyl group can then be introduced after oxidation of the 17 - hydroxyl group to a keto group and an intermediate protection of the 3 - keto group, for example, as ethylene ketal in known manner by a Grignard reaction by means of the corresponding saturated or unsaturated alkyl magnesium halide whereby, if desired, finally unsaturated 17 - alkyl substituents can be transformed by hydration into the finely desired degree of saturation.

The new compounds of the invention and methods for their preparation are illustrated in the following examples.

*Example I*

25 ml. of condensed ammonia and 100 mg. of metallic lithium added in small increments, were allowed to react for 2½ hours. Thereupon 1 g. of 1α,7α - dimethyl - $\Delta^4$-androstene - 17 - ol - 3 - one dissolved in 20 ml. absolute ether and 20 ml. dioxane were added drop by drop in the course of 30 minutes. After an additional 30 minutes, 5 g. ammonium chloride were added and the ammonia was allowed to evaporate. By ether extraction, washing, drying and evaporation in a vacuum, a crude product was obtained which was subjected to chromatographic separation over 50 g. SiO$_2$ containing 10% water with a mixture of methylene chloride and chloroform. After uniting the UV inactive fractions and recrystallizing them from isopropylether, 1α,7α - dimethyl - 5α-androstane - 17β - ol - 3 - one were obtained. It had a melting point of 157–158° C. and was obtained in a 55% theoretical yield.

*Example II*

The crude reduction product obtained in accordance with Example I was dissolved in 15 ml. methylene chloride and 50 ml. acetone, then added drop by drop into 1.2 ml. 8 N chromic acid solution while cooling with ice. The mixture was then stirred for an additional 15 minutes at room temperature, poured into ice water and extracted with methylene chloride. After drying over sodium sulfate, concentration and recrystallization from isopropyl ether, 1α,7α - dimethyl - 5α - androstane - 3,17 - dione having a melting point of 161.5 to 162° C. was obtained.

The 3,17 - diketone thus obtained was dissolved in 15 ml. absolute methylene chloride, the solution was treated with freshly distilled ethylene glycol and stored for 22 hours at room temperature while stirring and excluding humidity. The solution was stirred into ice water and a sodium bicarbonate solution, extracted with methylene chloride and subjected to chromatographic separation over neutral aluminum oxide containing 1% water. By elutriation with benzene, 1α,7α - dimethyl - 5α - androstane - 3,17 - dione - 3 - ethylene ketal having a melting point of 147.5 to 149° C. was obtained in a theoretical yield of 36%.

*Example III*

610 mg. 1α,7α-dimethyl-5α-androstane-3,17-dione-3-ethylene ketal was dissolved in 35 ml. methanol, 0.85 ml. 1 N sodium hydroxide were added and reacted while stirring at 0° C., with 120 mg. of NaBH$_4$. Thereafter stirring was continued for another hour at room temperature, the reaction mixture was poured into ice water and extracted with methylene chloride. After washing, drying over sodium sulfate and concentration in a vacuum, 1α,7α-dimethyl-5α-androstane-17β-ol-3-one-3-ethylene ketal was obtained.

The crude ketal was dissolved in 40 ml. methanol, 1.2 ml. of 8% by volume sulfuric acid were added and heating was carried out for 35 minutes on a water bath. After cooling, ice water was stirred in, the mixture was neutralized with sodium bicarbonate and extracted with methylene chloride. After washing, drying and concentration in a vacuum, the reaction product was recrystallized from isopropyl ether. 1α,7α-dimethyl-5α-androstane-17β-ol-3-one having a melting point of 157–158° C., identical with the product obtained in accordance with Example I, was obtained in a 75% theoretical yield.

*Example IV*

1.5 grams of the ketal prepared in accordance with Example II were dissolved in 100 ml. absolute benzene and added drop by drop, while cooling with ice and stirring, to an ether solution of methyl magnesium iodide prepared from 2.7 g. of magnesium chips, 6 ml. methyl iodide and 35 ml. absolute ether. This reaction mixture was stored for four hours at room temperature while stirring. Thereupon 400 ml. of a 10% aqueous ammonium chloride solution were added while cooling with ice. The aqueous phase was separated and extracted with ether. The ether phase and the benzene phase were purified, washed to neutral with water, dried over sodium sulfate and concentrated in a vacuum. After recrystallization from isopropyl ether, 1α,7α,17-trimethyl-5α-androstane-17β-ol-3-one-3-ethylene ketal was obtained.

This ketal was dissolved in 60 ml. methanol, treated with 1.7 ml. of 8% by volume sulfuric acid, heated for 35 minutes under reflux and, after cooling, stirred into 180 ml. water containing 0.6 g. sodium carbonate. Extraction was carried out with methylene chloride, it was washed to neutral, dried over sodium sulfate and concentrated in a vacuum. The residue was recrystallized from isopropyl ether. 1α,7α,17α-trimethyl-5α-androstane-17β-ol-3-one having a melting point of 173.5–174.5° C. was obtained in a 58% theoretical yield.

*Example V*

In a manner corresponding to that of Example IV, 1α,7α-dimethyl-17α-ethyl-5α-androstane-17β-ol-3-one having a melting point of 138.5 to 139.5° C. was obtained by reaction of 1α,7α-dimethyl-5α-androstane-3,17-dione-3-ethylene ketal with ethyl magnesium iodide.

*Example VI*

1 g. of the ketal prepared in the manner described in Example II and dissolved in 40 ml. absolute tetrahydrofuran was added drop by drop to a Grignard solution prepared by dissolving 6.5 g. ethylene bromide in 30 ml. tetrahydrofuran and adding it drop by drop to 2.9 g. of magnesium chips in absolute tetrahydrofuran. After 45 minutes of heating under reflux, the solution was decanted from the residue and slowly added, while stirring and introducing acetylene, to 35 ml. absolute tetrahydrofuran into which acetylene had been introduced previously for 15 minutes. After 30 minutes of additional introduction of acetylene, the steroid solution was then added drop by drop. After 21 hours reaction time at 70° C., the reaction mixture was cooled to 0° C. and 400 ml. of a 10% aqueous ammonium chloride solution were added. After extraction with ether, washing and drying of the ether phase, concentration to the dry state was effected in a vacuum. The residue was triturated with isopropyl ether and filtered off under suction. 1α,7α-dimethyl-17α-ethinyl-5α-androstane-17β-ol-3-one-3-ethylene ketal was obtained.

This ketal was dissolved in 40 ml. methanol, 1.5 ml. of 8% by volume sulfuric acid were added and the mixture was heated for 35 minutes to reflux. The solution was then cooled, introduced into ice water and extracted with methylene chloride. The methylene chloride phase was washed to neutral with water, dried over sodium sulfate, steamed under vacuum and the residue was recrystallized from ethyl acetate. 1α,7α-dimethyl-17α-ethinyl-5α-androstane-17β-ol-3-one having a melting point of 161–162.5° C. was obtained.

*Example VII*

770 mg. of the ketal prepared in accordance with Example VI were dissolved in 80 ml. pyridine and hydrated after addition of 120 mg. of a 5% palladium-carbon catalyst until one mol of hydrogen had been taken up.

Thereupon the catalyst was filtered off and the residue was evaporated under a vacuum. The residue was dissolved in 20 ml. methanol, 0.7 ml. of 8% by volume sulfuric acid were added and heating under reflux for 30 minutes was effected. Thereupon the reaction mixture was poured into an aqueous, ice cooled solution of 0.3 g. sodium carbonate and extraction was effected with methylene chloride. After washing, drying and concentration under a vacuum, the residue was recrystallized from isopropyl ether. 1α,7α-dimethyl-17α-vinyl-5α-androstane-17β-ol-3-one having a melting point of 140.5 to 141.5° C. was obtained.

*Example VIII*

10 ml. ammonia were condensed and added to 35 mg. lithium in small increments. After this a solution of 302 mg. 1α,7α,17-trimethyl-Δ⁴-androstene-17β-ol-3-one having a melting point of 183–184.5° C. and dissolved in 6 ml. absolute tetrahydrofuran were added drop by drop and stirred for an additional 30 minutes. This reaction mixture was then reacted with 1.5 g. ammonium chloride and the ammonia was allowed to evaporate. Extraction was then effected with ether, and the reaction mixture was then washed with water, dried over sodium sulfate and concentrated under a vacuum. The residue was dissolved in 4 ml. methylene chloride and 12 ml. acetone and oxidized with 0.4 ml. standard chromic acid solution at 0° C. After pouring into ice water, extraction was effected with methylene chloride, the reaction product was washed, dried and concentrated under a vacuum and subjected to chromatographic separation in 35 g. $SiO_2$ having a 10% water content.

By elutriation with carbon tetrachloride-methylene chloride mixtures and combining the UV inactive fractions, 1α,7α,17α-trimethyl-5α-androstane-17β-ol-3-one having a melting point of 173.4–174° C., identical with the product obtained in accordance with Example I, were obtained in a 42% theoretical yield.

*Example IX*

2 g. of 1α,7α-dimethyl-Δ⁴-androstene-17β-ol-3-one were dissolved in 100 ml. of absolute benzene, 50 mg. p-toluene sulfonic acid and 5 ml. ethylene glycol were added, and the mixture was heated to reflux for 48 hours while stirring and while under a nitrogen atmosphere. The water developed by the reaction was absorbed in the thimble of a Soxhlet apparatus filled with neutral aluminum oxide between the reaction vessel and the reflux cooler. The benzene solution was washed, first with 1 N sodium hydroxide and then with water, dried and concentrated in a vacuum and subjected to chromatographic separation over 150 g. of neutral aluminum oxide containing 1% water. By elutriation with benzene, 1α,7α-dimethyl-Δ⁵-androstene-17β-ol-3-one-ethylene ketal having a melting point of 150.5–153.5° C. was obtained.

695 mg. of the ketal thus obtained were dissolved in 40 ml. absolute ethanol and hydrated under normal conditions after addition of 77 mg. of 5% palladium or barium sulfate which had previously been hydrated in 30 ml. ethanol. After the addition of water ceased, the catalyst was filtered off, the reaction product was concentrated under a vacuum and the residue was recrystallized from pentane. 1α,7α-dimethyl-5α-androstane-17β-ol-3-one-3-ethylene ketal having a melting point of 160–162° C. was obtained.

The androstane ketal thus obtained was dissolved in 40 ml. methanol and boiled under reflux after addition of 1.5 ml. of 8% by volume sulfuric acid for 30 minutes. After cooling, it was poured into ice water, neutralized with sodium carbonate, extracted with methylene chloride, concentrated under vacuum, and the residue was crystallized from isopropyl ether. 1α,7α-dimethyl-5α-androstane-17β-ol-3-one having a melting point of 156–158° C., identical with the product obtained in accordance with Example I, was obtained in a 26% theoretical yield.

*Example X*

414 mg. of 1α,7α-dimethyl-5α-androstane-17β-ol-3-one were dissolved in 1.66 ml. absolute pyridine, 0.83 ml. acetic anhydride was added and the reaction mixture was allowed to stand for 16 hours at room temperature. Thereafter it was added to ice water, acidified with dilute hydrochloric acid, extracted with methylene chloride, washed neutral, dried over sodium sulfate, concentrated in a vacuum and the residue was crystallized from isopropyl ether. 1α,7a-dimethyl-5α-androstane-17β-ol-3-one-17-acetate having a melting point of 159.5-161° C. was obtained in a theoretical yield of 86%.

*Example XI*

318 mg. 1α,7α-dimethyl-5α-androstane-17β-ol-3-one were dissolved in 1 ml. dry pyridine. 0.7 ml. propionic acid anhydride were added and the reaction mixture was allowed to stand at room temperature for 15 hours. After adding to ice water and acidifying with dilute hydrochloric acid, the reaction product was extracted with methylene chloride, washed neutral, dried over sodium sulfate, concentrated in a vacuum and crystallized from isopropyl ether. 1α,7α-dimethyl-5α-androstane-17β-ol-3-one-17-propionate having a melting point of 125–126° C. was obtained.

*Example XII*

318 mg. of 1α,7α-dimethyl-5α-androstane-17β-ol-3-one were dissolved in 2 ml. dry pyridine and treated, at 0° C., with 0.3 ml. dichloroacetyl chloride added drop by drop. The reaction mixture was allowed to stand over night in a refrigerator, it was then poured into ice water, acidified with dilute hydrochloric acid and extracted with methylene chloride. The methylene chloride phase was washed neutral with water, dried over sodium sulfate and evaporated under vacuum. After recrystallization of the residue from isopropyl ether, 1α,7α-dimethyl-5α-androstane-17β-ol-3-one-17-dichloroacetate having a melting point of 144–145° C. was obtained.

We claim:
1. A compound of the formula

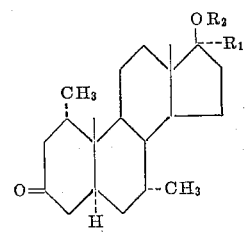

wherein $R_1$ is a member selected from the group consisting of hydrogen, lower alkyl, lower alkenyl, and lower alkinyl, and $R_2$ is a member selected from the group consisting of hydrogen, acyl, and a physiologically replaceable inorganic acid radical.

2. 1α,7α-dimethyl-5α-androstane-17β-ol-3-one.
3. 1α,7α,17α-trimethyl-5α-androstane-17β-ol-3-one.
4. 1α,7α-dimethyl-17α-ethyl-5α-androstane-17β-ol-3-one.
5. 1α,7α-dimethyl-17α-ethinyl-5α-androstane-17β-ol-3-one.
6. 1α,7α-dimethyl-17α-vinyl-5α-androstane-17β-ol-3-one.
7. 1α,7α-dimethyl-5α-androstane-17β-ol-3-one-17-acetate.
8. 1α,7α-dimethyl-5α-androstane-17β-ol-3-one-17-propionate.
9. 1α,7α-dimethyl-5α-androstane-17β-ol-3-one-17-dichloro-acetate.

References Cited

FOREIGN PATENTS 1,152,100   8/1963   Germany.

LEWIS GOTTS, *Primary Examiner.*

H. A. FRENCH, *Assistant Examiner.*